US010703072B2

(12) United States Patent
Klein et al.

(10) Patent No.: US 10,703,072 B2
(45) Date of Patent: Jul. 7, 2020

(54) HEATABLE LAMINATED VEHICLE WINDOW WITH IMPROVED HEAT DISTRIBUTION (71) Applicant: SAINT-GOBAIN GLASS FRANCE, Courbevoie (FR)

(72) Inventors: Marcel Klein, Baesweiler (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 301 days.

(21) Appl. No.: 15/748,118

(22) PCT Filed: Sep. 29, 2016

(86) PCT No.: PCT/EP2016/073359
§ 371 (c)(1),
(2) Date: Jan. 26, 2018

(87) PCT Pub. No.: WO2017/063895
PCT Pub. Date: Apr. 20, 2017

(65) Prior Publication Data
US 2018/0222156 A1 Aug. 9, 2018

(30) Foreign Application Priority Data
Oct. 13, 2015 (EP) .................................... 15189476

(51) Int. Cl.
H05B 3/86 (2006.01)
B32B 17/10 (2006.01)

(52) U.S. Cl.
CPC .. *B32B 17/10036* (2013.01); *B32B 17/10183* (2013.01); *B32B 17/10761* (2013.01);
(Continued)

(58) Field of Classification Search
CPC ........ B32B 17/10183; B32B 17/10036; H05B 3/84; H05B 3/845; H05B 3/86;
(Continued)

(56) References Cited

U.S. PATENT DOCUMENTS

| 4,361,751 A | 11/1982 | Criss et al. |
| 2002/0015824 A1 | 2/2002 | Kawamoto et al. |

(Continued)

FOREIGN PATENT DOCUMENTS

| DE | 102007008833 A1 | 8/2008 |
| EP | 1168888 A2 | 1/2002 |

(Continued)

OTHER PUBLICATIONS

Written Opinion for International Application No. PCT/EP2016/073359 filed on Sep. 29, 2016 on behalf of Saint-Gobain Glass France dated Dec. 9, 2016 9 pages (English + Original).

(Continued)

*Primary Examiner* — Erin Deery
(74) *Attorney, Agent, or Firm* — Pillsbury Winthrop Shaw Pittman LLP (57) ABSTRACT A heatable laminated vehicle window for separating a vehicle interior from an outer surrounding area is presented. The vehicle window includes an outer pane bonded to an inner pane via a thermoplastic intermediate layer. An electrically heatable coating of the vehicle window is electrically connected to two busbars such that by applying a supply voltage across the two bus bars, a heating current that forms heating field flows between the two busbars. In one aspect, a metal element is arranged on or in the vehicle window such that heat is dissipated out of a region of the heating field that has elevated heat generation by means of thermal conduction of the metal element.

20 Claims, 5 Drawing Sheets (52) U.S. Cl.
CPC ............ *H05B 3/86* (2013.01); *B32B 2367/00* (2013.01); *H05B 2203/008* (2013.01); *H05B 2203/011* (2013.01); *H05B 2203/016* (2013.01); *H05B 2203/017* (2013.01); *H05B 2203/037* (2013.01)

(58) Field of Classification Search
CPC ........ H05B 2203/008; H05B 2203/011; H05B 2203/037
See application file for complete search history.

(56) References Cited

U.S. PATENT DOCUMENTS

| | | |
|---|---|---|
| 2003/0116551 A1 | 6/2003 | Sol et al. |
| 2005/0045613 A1 | 3/2005 | Maeuser et al. |
| 2007/0020465 A1 | 1/2007 | Thiel et al. |
| 2007/0082219 A1 | 4/2007 | Fleury et al. |
| 2009/0166347 A1 | 7/2009 | Blanchard et al. |
| 2010/0270280 A1 | 10/2010 | Blanchard et al. |
| 2011/0108537 A1 | 5/2011 | Schall |
| 2012/0000896 A1 | 1/2012 | Phan et al. |
| 2013/0092676 A1 | 4/2013 | Offermann et al. |
| 2013/0213949 A1 | 8/2013 | Lisinski et al. |
| 2013/0220992 A1 | 8/2013 | Lisinski et al. |
| 2014/0027434 A1 | 1/2014 | Reul et al. |
| 2015/0334779 A1 | 11/2015 | Phan et al. |
| 2015/0351160 A1 | 12/2015 | Phan et al. |
| 2016/0249413 A1* | 8/2016 | Lim ................... H05B 3/12 |
| 2016/0316521 A1 | 10/2016 | Goutiere et al. |

FOREIGN PATENT DOCUMENTS

| | | |
|---|---|---|
| EP | 1454509 B1 | 4/2007 |
| EP | 2274251 A1 | 1/2011 |
| EP | 1980137 B1 | 3/2014 |
| JP | 2002020142 A | 1/2002 |
| KR | 20130066656 A | 6/2013 |
| KR | 20130139335 A | 12/2013 |
| KR | 20150072866 A | 6/2015 |
| TW | 200817633 A | 4/2008 |
| WO | 03/024155 A2 | 3/2003 |
| WO | 2007/015861 A2 | 2/2007 |
| WO | 2007/015861 A3 | 2/2007 |
| WO | 2010/136400 A1 | 12/2010 |
| WO | 2012/031907 A1 | 3/2012 |
| WO | 2012/031908 A1 | 3/2012 |
| WO | 2014/095152 A1 | 6/2014 |
| WO | 2014/095153 A1 | 6/2014 |
| WO | 2015/017673 A1 | 5/2015 |
| WO | 2015/101462 A1 | 7/2015 |

OTHER PUBLICATIONS

International Search Report for International Application No. PCT/EP2016/073359 filed Sep. 29, 2016 on behalf of Saint-Gobain Glass France, dated Dec. 9, 2016. 7 pages. (German + English Translation).
First Office Action as issued in Chinese Patent Application No. 201680002223.9, dated Jan. 2, 2020.

\* cited by examiner

HEATABLE LAMINATED VEHICLE WINDOW WITH IMPROVED HEAT DISTRIBUTION

CROSS REFERENCE TO RELATED APPLICATIONS

The present application is the U.S. national stage of International Patent Application PCT/EP2016/073359 filed internationally on Sep. 29, 2016, which, in turn, claims priority to European Patent Application No. 15189476.3 filed on Oct. 13, 2015.

The invention relates to a heatable laminated vehicle window, a method for its production, and the use of such a vehicle window.

Vehicle windows with transparent, heatable coatings are well known. Merely by way of example, reference is made to the publications WO03/024155A2, US2007/0082219A1, US2007/0020465A1, EP2274251A1, EP1980137B1, and EP1454509B1. They are, in particular, used as windshields, to which particularly high optical requirements apply. By means of the heatable coating, the windshield can be equipped with an active heating function in order to free it from condensation or ice as needed, without through-vision vision being impaired by heating wires or printed-on heating conductors. The heatable coatings are customarily multi-layer systems including silver layers. They are electrically contacted to at least two strip-shaped or band-shaped bus-bars which should introduce the current as uniformly as possible into the coating. A current flows through the coating between the busbars, forming a heating field.

The design of the heatable vehicle windows presents the challenge of uniform heat distribution. It is, in particular, important to avoid regions with excessively great, local heat generation. Namely, very high pane temperatures can occur on which people can be burned, which impose high thermal stresses on the panes, and which can detach the bonding points of attachment parts. Regions with elevated heat generation occur, for example, where the busbars are contacted to an external supply line because the current transfer into the heatable coating is greatest at these locations.

Since conductive coatings strongly screen electromagnetic radiation, it is customary to provide local regions where the coating is completely or partially lacking. Thus, radio data communication into the vehicle interior is ensured and the functionality of sensors installed in the vehicle interior, which detect, for example, infrared signals, is retained. These local de-coated or coating-free regions are commonly referred to as communication windows or sensor windows. However, coating-free zones negatively impact the electrical properties of the heating layer, at least locally affecting the current density distribution of the heating current flowing through the heating layer. In fact, they cause a strongly inhomogeneous heating power distribution whereby the heating power below and in the vicinity of the coating-free zones is significantly reduced. On the other hand, locations with particularly high current density (hot spots) occur, in which the heating power is greatly elevated. As a result, very high local pane temperatures can also occur in the the vicinity of communication windows. Various approaches have been proposed to mitigate against the inhomogeneity of the heating power as a result of the presence of a communication window. They are based, in particular, on auxiliary conductors connected to the busbars, as, for example, in WO2010136400A1, WO2012031907A1, or WO2012031908A1, or on laser patterning of the heating layer around the communication window, as, for example, in WO2014095152A1 or WO2014095153A1.

The object of the invention is to provide a laminated vehicle window with improved heat distribution that is simple and economical to produce.

The object of the present invention is accomplished according to the invention by a heatable laminated vehicle window in accordance with the disclosure. Preferred embodiments emerge from the disclosure.

The heatable laminated vehicle window according to the invention is provided for separating a vehicle interior from an outer surrounding area. The vehicle window is thus a window pane that is inserted or provided to be inserted in a window opening of the vehicle body. The vehicle window according to the invention is, in particular, a windshield of a motor vehicle.

The vehicle window according to the invention comprises at least one first and one second pane that are bonded to one another via a thermoplastic intermediate layer. The two panes can also be referred to as "outer pane" and "inner pane". "Inner pane" refers to that pane which faces the interior of the vehicle in the installed position. "Outer pane" refers to that pane which faces the external surroundings of the vehicle in the installed position. The thermoplastic intermediate layer is typically formed from at least one thermoplastic film.

That surface of the respective pane that faces the external surroundings of the vehicle in the installed position is referred to as the "exterior-side surface". That surface of the respective pane that faces the interior of the vehicle in the installed position is referred to as the "interior-side surface". The interior-side surface of the outer pane is bonded to the exterior-side surface of the inner pane via the thermoplastic intermediate layer. Customarily, the exterior-side surface of the outer pane is referred to as "Side I"; the interior-side surface of the outer pane as "Side II"; the exterior-side surface of the inner pane as "Side III"; and the interior-side surface of the inner pane as "Side IV".

The vehicle window according to the invention also comprises an electrically heatable coating. The heatable coating can be arranged on one of the surfaces of the outer pane or the inner pane, in particular on the surfaces (Side II or Side III) facing the thermoplastic intermediate layer, where the heatable coating is advantageously protected in the laminate against corrosion and damage. Alternatively, the heatable coating can be embedded in the thermoplastic intermediate layer, in particular, arranged on a polymeric carrier film within the intermediate layer.

The heatable coating according to the invention is transparent. In the context of the invention, "a transparent coating" means a coating that has transmittance of at least 70% in the visible spectral range, preferably at least 80%, particularly preferably at least 90%.

The heatable coating is electrically contacted to at least two so-called busbars. The busbars are frequently also referred to as collecting electrodes. They are typically implemented band-shaped or strip-shaped and serve to introduce the current into the coating as homogeneously as possible over the width thereof. The busbars are provided for electrical connecting to the two poles of a voltage source. The heatable coating is electrically connected to the busbars such that by applying a supply voltage, a heating current flows between the at least two busbars, by means of which, as a result of the electrical resistance of the coating and the heating associated therewith, a heating field is formed between the busbars. Typically, the busbars are arranged directly on or under the heatable coating, are thus in direct contact with the heatable coating.

The vehicle window is equipped according to the invention with at least one metal element that is arranged on or in the vehicle window such that heat is dissipated out of a region of the heating field with elevated heat generation by means of thermal conduction of the metal element into a region with lower heat generation. The inventors discovered that, with this simply and economically implementable measure, the homogeneity of the heat distribution on the pane can be significantly improved, as a result of which, in particular, dangerous hot spots can be avoided and the heating in colder regions of the pane can be improved. These are major advantages of the present invention.

The metal element is preferably a planar element. The term "planar element" means an element whose thickness is significantly smaller than its width and length, such as, for instance, a foil or a sheet. The planar element is preferably bendable and flexible at room temperature (in particular, 20° C.) such that it can be adapted to the typically curved shape of the vehicle window without having to be specially preshaped. Alternatively, it is, however, also possible to use a rigid element and to provide it with the appropriate bending in advance. The planar element is, in particular, arranged flat on or in the vehicle window, i.e., substantially parallel to the surfaces of the pane.

The metal element preferably has a specific thermal conductivity of at least 140 W/(mK), preferably of at least 350 W/(mK).

The metal element is arranged such that it overlaps a section of the heatable coating that includes regions of different heat generation. The projection of the metal element onto the heatable coating corresponds to a region of the heatable coating. This region has a heating power locally that is at least 15% higher than the average heating power of the heating field. Here, the term "local" means that the elevated heating power does not occur in the entire region, but, rather, that the region also includes regions with a lower heating power. Thus, heat can be dissipated out of the region with the elevated heat generation through the metal element into the regions with lower heat generation. As a measure for the heating power, the temperature that would be reached after a predefined time without the presence of the metal element can be used. It can be determined experimentally or by simulations.

In a particularly advantageous embodiment, the region of the projection of the metal element onto the heatable coating also includes a region with below-average heating power. Thus, the heat from the above-average heated region can be used to additionally heat the below-average heated region. The region with below-average heating power preferably has heating power that is at least 15% lower than the average heating power of the heating field.

By means of the invention, inhomogeneities of the heating power that occur in connection with a so-called communication or sensor window can be effectively mitigated. In an embodiment of the invention, the vehicle window consequently has, between the busbars, i.e., within the heating field, such a communication or sensor window, i.e., a locally limited region that is completely or partially free of the heatable coating. The communication or sensor window is typically situated outside the central field of vision (field of vision A per ECE-R 43), usually in the upper or lower edge region of the pane in the vicinity of one of the busbars. The coating is removed after the fact, for example, mechanically-abrasively or by laser ablation, or excluded in advance from the coating, for example, by masking techniques. Viewed in the direction of the flow of current, regions of elevated heat generation form near the coating-free region because the current flowing around the coating-free region is concentrated there. Dangerous hot spots can form. The metallic element according to the invention is, consequently, arranged—viewed in the direction of flow of the current—next to the side of the coating-free region, preferably on both sides next to the side of the coating-free region. The metal element then extends from a region with a short distance from the coating-free region with elevated heat generation into a region with a greater distance from the coating-free region with lower heat generation. Thus, the excess heat in the immediate vicinity of the coating-free region is, as it were, transported away from this region, by which means the heat distribution is homogenised and the hot spot is avoided or at least mitigated. The distance of the metal element from the coating-free region is preferably 2 mm at most. The width of the metal element depends on the design of the pane and is, for example, at least 10 mm. The width is the dimension perpendicular to the direction of the flow of current.

In an improvement of the above-described embodiment, the metal element is arranged on both sides next to the side of the coating-free region and also extends therebetween along the side of the coating-free region facing away from the nearest busbar. The coating-free region is surrounded on three sides by the metal element, and, precisely, on all sides with the exception of the sides facing the nearest busbar. The advantage resides in that the excess heat generated next to the side of the coating free region is transported into the region of the coating on the side of the coating free region opposite the nearest busbar, which lies, so to speak, in an "electrical shadow" of the coating free region, and, consequently, has only reduced heat generation. Thus, a further improved homogenization of the heating action is obtained.

In principle, the coating-free region can even be completely surrounded, in other words, on all four sides, by the metal element. Likewise, it is also conceivable for the metal element to be arranged not on both sides, but rather on only one side next to the side of the coating-free region and also along the side of the coating-free region facing away from the nearest busbar.

The metal element can also run over the coating-free region.

By means of the invention, inhomogeneities of the heating power that occur in relation to the electrical supply line to a busbar can be effectively mitigated. This supply line occurs by means of a connection cable connected to the busbar, in particular a so-called flat conductor or foil conductor or a simple foil strip. In the region of the heating field adjacent the contact points between the supply line and the busbar, elevated heat generation usually develops because a portion of the current passes over from this contact point into the heatable coating instead of being homogeneously distributed by the busbar along its entire width. This can be mitigated in that the metal element overlaps the contact point between the busbar and the electrical supply line connected thereto. This means that the projection of the metal element onto the heatable coating corresponds to a region that includes the projection of said contact point onto the heatable coating. The metallic element extends from the contact point in whose surroundings the elevated heat generation occurs into regions with less heat generation, by which means the excess heat is effectively dissipated and distributed.

The metal element is preferably a metal foil or a metal sheet. In the context of the invention, the distinction between a foil and a sheet is that at room temperature (in particular, 20° C.), the foil is nonrigid and the sheet is rigid. A suitable metal foil preferably contains copper, aluminum, silver, or mixtures or alloys thereof. Due to the thermal conductivity and good availability, copper is particularly preferred. The thickness of the foil is preferably from 5 µm to 200 µm, particularly preferably from 15 µm to 80 µm. A suitable sheet preferably contains copper, steel, stainless steel, aluminum, or mixtures or alloys thereof. Particularly preferable are steel, stainless steel, or aluminum, because attachment parts made of these materials are common on vehicle windows. The thickness of the sheet is preferably from 2 mm to 50 mm, particularly preferably from 5 mm to 25 mm. The metal element can also be a cast part, for example, containing steel, stainless steel, or cast-iron, for example, with a thickness of 2 mm to 50 mm, preferably from 5 mm to 25 mm.

In a first preferred embodiment, the metal element is laminated into the vehicle window, i.e., arranged between the outer pane and the inner pane. This embodiment is suitable for foils and for sheets as the metal element, both of which can be laminated-in. The embodiment is particularly preferable for foils as the metal element because, by means of the thin foil, the bond between the glass panes and the thermoplastic layer is disturbed particularly little, which is advantageous in terms of the stability of the laminated vehicle window.

The metal element can be, in the first preferred embodiment, separated from the heatable coating by the thermoplastic material of the intermediate layer. There is then no electrical connection between a metallic element and a heatable coating such that the flow of current is unaffected by the metal element. However, the thermal conduction nevertheless takes place adequately through the material of the intermediate layer. In particular, the following arrangements can be selected:

The heatable coating is applied on the interior-side surface of the outer pane or the exterior-side surface of the inner pane, and the metal element is laminated into the intermediate layer, i.e., preferably arranged between two films of the intermediate layer.

The heatable coating is applied on the interior-side surface of the outer pane, and the metal element is arranged on the exterior-side surface of the inner pane.

The heatable coating is applied on the exterior-side surface of the inner pane, and the metal element is arranged on the interior-side surface of the outer pane.

The heatable coating is arranged on a carrier film in the intermediate layer, and the metal element is arranged on the uncoated surface of the carrier film.

Alternatively, the metal element can be, in the first preferred embodiment, arranged directly on the heatable coating, whereby the heat transfer is particularly effective. The inventors surprisingly found that by direct contact even with a conducting connection between the coating and the metal element, the flow of current and the heating action are not appreciably affected adversely. The reason is that customary heatable coatings have, as the uppermost layer, a dielectric, electrically nonconductive layer. This dielectric cover layer seems to be adequate to isolate the conductive layers of the coating and the metal element from one another. The metal element can, optionally, be provided with an electrically insulating coating in order to prevent current conduction, for example, by means of a clear lacquer. In particular, the following arrangements can be selected:

The heatable coating is applied on the interior-side surface of the outer pane, and the metal element is also arranged on the interior-side surface of the outer pane.

The heatable coating is applied on the exterior-side surface of the inner pane, and the metal element is also arranged on the exterior-side surface of the inner pane.

The heatable coating is arranged on a carrier film in the intermediate layer, and the metal element is arranged on the coated surface of the carrier film.

In a second preferred embodiment, the metal element is arranged on the interior-side surface of the inner pane (Side IV). The heat transfer then occurs at least via the inner pane. The inventors found that, in this configuration as well, the heat transfer is adequate. This embodiment is also suitable for foils and sheets as a metallic element but even for cast parts. It is particularly preferred for sheets and cast parts because these can be laminated-in less well than foils, but have higher stability than foils when applied on an outer surface. In particular, even already existing elements can be used with suitable positioning as a metal element according to the invention. Examples of such elements are mounts, so-called brackets, for sensors, cameras, or rearview mirrors, which are typically produced from metal sheets or cast parts.

The purpose of the invention is, of course, equally satisfied by a metal element mounted on the exterior-side surface of the outer pane (Side I). This is, however, not preferable since the metal element then would affect the external appearance of the vehicle, which is, as a rule, unacceptable to consumers.

The fastening of the metal element on the interior-side surface of the inner pane is preferably done by means of an adhesive.

Even parts of the vehicle body can be used as the metal element if they are appropriately positioned in the installed state of the pane.

When the metal element is implemented as a sheet or a cast part and applied on the interior-side surface of the inner pane, it is implemented, in an advantageous embodiment, with cooling ribs. Thus, avoidance of hot spots can be optimised.

The metal element is, in an advantageous embodiment, arranged in a region of the vehicle window that is provided with an opaque masking print. Such a masking prints are customary for vehicle windows outside the central vision region to conceal attachment parts such as sensors or to protect the adhesive with which the vehicle window is connected to the vehicle body against UV radiation. The masking print typically consists of a black or dark enamel applied and fired in the screenprinting process. The masking print is arranged externally relative to the metal element, i.e., is a shorter distance from the external environment than the metal element. Thus, the metal element is concealed for an observer situated outside the vehicle and is not visible from the outside. If the metal elements is laminated into the vehicle window, the masking print is preferably arranged on Side II. If the metal element is arranged on the interior-side surface of the inner pane (Side IV), the masking print is preferably arranged on Side II, Side III, or Side IV below the metallic element. Naturally, the vehicle window can also have two masking prints between which the metal element is situated such that it is concealed from both sides. If the metal element is laminated into the composite pane, a masking print is preferably arranged externally relative to the metal element (Side I or II) and a masking print is arranged internally relative to the metal element (Side III or IV).

The heatable coating has at least one electrically conductive layer. The coating can, additionally, have dielectric layers, which serve, for example, for regulating the sheet resistance, for corrosion protection, or for reducing reflection. The conductive layer preferably includes silver or an electrically conductive oxide (transparent conductive oxide, TCO) such as indium tin oxide (ITO). The conductive layer preferably has a thickness of 10 nm to 200 nm. Thus, a good compromise between transparency and electrical conductivity of the layer is obtained. For improving the conductivity with simultaneously high transparency, the coating can have multiple electrically conductive layers that are separated from one another by at least one dielectric layer. The conductive coating can, for example, include two, three, or four electrically conductive layers. Typical dielectric layers contain oxides or nitrides, for example, silicon nitride, silicon oxide, aluminum nitride, aluminum oxide, zinc oxide, or titanium oxide.

In a particularly preferred embodiment, the heatable coating has at least one electrically conductive layer, which contains silver, preferably at least 99% silver. The layer thickness of the electrically conductive layer is preferably from 5 nm to 50 nm, particularly preferably from 10 nm to 30 nm. The coating preferably has two or three of these conductive layers, which are separated from one another by at least one dielectric layer. Such coatings are particularly advantageous in terms of, on the one hand, the transparency of the pane and, on the other, its conductivity.

A frame-like edge region of the pane is preferably not provided with the heatable coating. This edge region is frequently referred to as an edge deletion (in the case of a coating applied on a pane) or a cutback (in the case of a coating on a carrier film). This ensures that the heatable coating has no contact with the surrounding atmosphere, whereby corrosion is prevented—the coating is, as it were, encapsulated in the intermediate layer. The width of the coating-free edge region is typically from 0.5 mm to 20 mm, in particular from 1 mm to 10 mm. The visually conspicuous transition of the coated and the uncoated region is typically concealed by an opaque masking print.

The busbars can be implemented as printed and fired paste, in particular screenprinting paste, or as strips of an electrically conductive foil. If the heatable coating is applied on a pane surface, both variants are suitable. If the heatable coating is applied on a carrier film in the intermediate layer, an electrically conductive foil is, in particular, suitable. The fired paste contains at least metal particles, preferably silver particles and glass frits. The layer thickness of the printed busbars is preferably from 5 µm to 40 µm, particularly preferably from 10 µm to 20 µm. Printed busbars with these thicknesses are technically simple to realise and have advantageous current carrying capacity. The electrically conductive foil preferably contains aluminum, copper, tinned copper, gold, silver, zinc, tungsten, and/or tin or alloys thereof, particularly preferably copper. The thickness of the electrically conductive foil is preferably from 10 µm to 500 µm, particularly preferably from 30 µm to 200 µm, for example, 50 µm or 100 µm. Busbars made of electrically conductive foils with these thicknesses are technically simple to realise and have advantageous current carrying capacity. The electrically conductive foil can be electrically conductingly connected directly, via a soldering compound or an electrically conductive adhesive. To improve the conducting connection, a silver-containing paste can, for example, be arranged between the conductive coating and the busbar.

The busbars are typically arranged along two opposing side edges of the vehicle window, customarily along the upper edge and the lower edge. The designations "upper edge" and "lower edge" refer here to the orientation in the installed position of the vehicle window. The busbars have a small distance from said side edge (the mean distance from said side is less than to all other side edges) and their direction of extension substantially follows the direction of the side edge.

The length of the busbars depends on the design of the vehicle window, in particular on the length of the edge along which the busbar is arranged and can be appropriately selected in the individual case by the person skilled in the art. The term "length" of the typically strip-shaped busbars means their longer dimension, which extends substantially perpendicular to the direction of propagation of the current. The width of the busbars is preferably from 1 mm to 20 mm, preferably from 2 mm to 10 mm, whereby good heating power can be obtained.

The inner pane and the outer pane are preferably made of glass, particularly preferably soda lime glass, which has proven itself for window glass. The panes can also, however, be made of other types of glass, for example, borosilicate glass or aluminosilicate glass. The panes can, in principle, alternatively, be made of plastic, in particular polycarbonate (PC) or polymethylmethacrylate (PMMA).

The thickness of the panes can vary widely and thus be ideally adapted to the requirements in the individual case. Preferably, the thicknesses of the outer pane of the inner pane are from 0.5 mm to 10 mm, particularly preferably from 1 mm to 5 mm, most particularly preferably from 1.2 mm to 3 mm.

The outer pane, the inner pane, or the intermediate layer can be clear and colourless, but also tinted, frosted, or coloured. The total transmittance through the composite glass is, in a preferred embodiment, greater than 70%, in particular when the composite glass is a windshield. The term "total transmittance" is based on the method established by ECE-R 43, Annex 3, § 9.1 for testing the light permeability of motor vehicle windows. The outer pane and the inner pane can be made of non-prestressed, partially prestressed, or prestressed glass.

The vehicle window is preferably curved in one or a plurality of spatial directions, as is customary for motor vehicle windows, with typical radii of curvature in the range from approx. 10 cm to approx. 40 m. The composite glass can, however, also be flat, for example, when it is provided as a pane for buses, trains, or tractors.

The intermediate layer is preferably formed by at least one thermoplastic film. The thermoplastic film includes at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of a thermoplastic film is preferably from 0.2 mm to 2 mm, particularly preferably from 0.3 mm to 1 mm, for example, 0.38 mm or 0.76 mm.

If the heatable coating is arranged on a carrier film, this carrier film is preferably arranged between two thermoplastic films. The intermediate layer then comprises at least two thermoplastic bonding films and a carrier film with an electrically heatable coating arranged therebetween.

The carrier film preferably includes at least polyethylene terephthalate (PET), polyethylene (PE), or mixtures or copolymers or derivatives thereof. This is particularly advantageous for the handling, the stability, and the optical properties of the carrier film. The carrier film preferably has a thickness of 5 µm to 500 µm, particularly preferably of 10 µm to 200 µm, and most particularly preferably of 12 µm to 75 μm. Carrier films with these thicknesses can be advantageously prepared in the form of flexible and simultaneously stable films that are easy to handle.

The invention further includes a method for producing a heatable laminated vehicle window for separating a vehicle interior from an outer surrounding area. The method comprises at least the following process steps:

(a) Preparing an outer pane, a thermoplastic intermediate layer, and and inner pane, wherein the outer pane, the inner pane, or the intermediate layer is provided with an electrically heatable coating, (b) Connecting the heatable coating to at least two busbars provided for electrical connecting to the two poles of a voltage source such that by applying a supply voltage, a heating current flows via a heating field form between the at least two busbars, (c) The outer pane and the inner pane are bonded to one another via the intermediate layer by lamination, wherein before or after lamination, at least one metal element is arranged on or in the vehicle window such that heat is dissipated out of a region of the heating field with elevated heat generation by means of thermal conduction of the metal element.

If the heatable coating is applied on a surface of one of the panes, the stack is preferably arranged for lamination such that the coating faces the intermediate layer. The intermediate layer is prepared in the form of at least one film. If the coating is prepared on a carrier film, the carrier film is arranged for lamination preferably between a first thermoplastic film and a second thermoplastic film. The thermoplastic films, together with the carrier film, form the intermediate layer.

The heatable coating is applied using methods known per se. Preferably, the coating is done by magnetically enhanced cathodic sputtering (sputtering). This is particularly advantageous in terms of a simple, quick, economical, and uniform coating of the substrate. Carrier films with heatable coatings are also available commercially such that the coated carrier film does not have to be specially produced.

The mounting of the busbars can be done in particular by placement, printing, soldering, or gluing.

If the vehicle window is to be bent, the outer pane and the inner pane are subjected, preferably before lamination, to a bending process. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. The bending is preferably done after the application of the heatable coating on one of the panes since the coating of a flat pane is technically simpler and, in addition, the optical properties of the coating are improved by the heating during bending, without necessitating a separate tempering step.

The production of the composite glass by lamination is done with customary methods known per se to the person skilled in the art, for example, autoclave methods, vacuum bag methods, vacuum ring methods, calendar methods, vacuum laminators, or combinations thereof. The bonding of the outer pane and the inner pane is customarily done under the action of heat, vacuum, and/or pressure.

If the metal element is to be laminated into the vehicle window, it is placed at a suitable position in the stack for lamination, for example, between the intermediate layer and the outer or the inner pane or between two films of the intermediate layer. The metal element can be arranged directly on the heatable coating or separated there from by at least one film of the intermediate layer. The metal element can, optionally, be fixed on one of the panes or a film of the intermediate layer, for example, by gluing, such that it cannot slip. If the metal element is to be mounted on the interior-side surface of the inner pane, it is preferably glued on the surface.

The use of a metal element in the heatable laminated vehicle window for the dissipation of heat out of a region of elevated heat generation by means of thermal conduction is shown.

The invention further includes the use of the vehicle window according to the invention in means for transportation for travel on land, in the air, or on water, preferably in motor vehicles, and, in particular, as a windshield.

In the following, the invention is explained in detail with reference to drawings and exemplary embodiments. The drawings are schematic representations and are not true to scale. The drawings in no way restrict the invention.

They depict.

Figure 1:
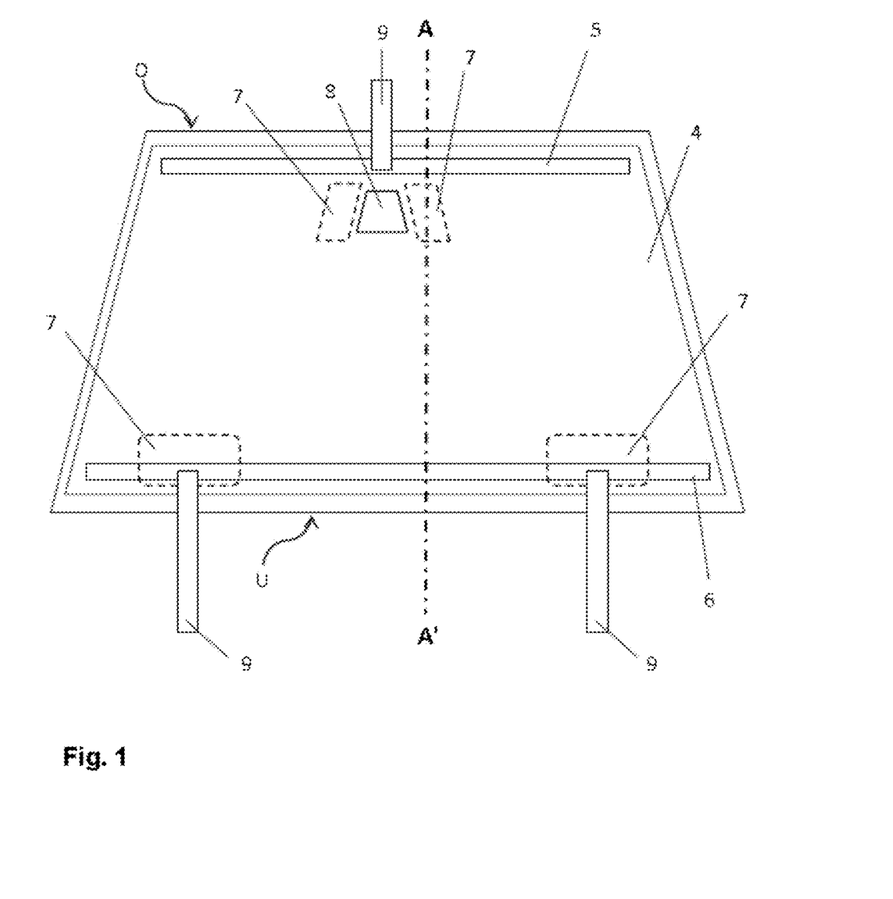
FIG. 1 a plan view of an embodiment of the vehicle window according to the invention, FIG. 2 a cross-section along A-A' through the vehicle window of FIG. 1, FIG. 3 a cross-section along A-A' through another embodiment of the vehicle window according to the invention, FIG. 4 a cross-section along A-A' through another embodiment of the vehicle window according to the invention, FIG. 5 a plan view of another embodiment of the vehicle window according to the invention, FIG. 6 a flowchart of an embodiment of the method according to the invention, and FIG. 7 a flowchart of another embodiment of the method according to the invention.
Figure 2:
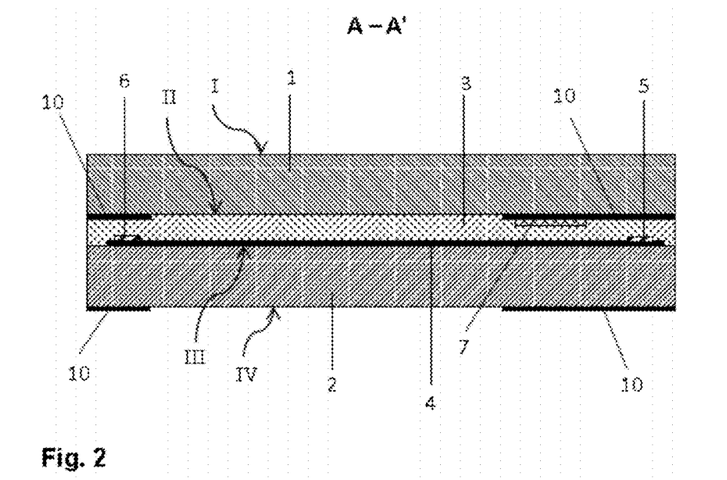

FIG. 1 and FIG. 2 depict in each case a detail of a vehicle window according to the invention. The vehicle window is the windshield of a passenger car and is implemented as composite glass composed of an outer pane 1 and an inner pane 2 that are bonded to one another via a thermoplastic intermediate layer 3. The outer pane 1 and the inner pane 2 are made of soda lime glass and have a thickness of, for example, 2.1 mm. The intermediate layer 3 is formed from a PVB film with a thickness of 0.76 mm.

A heatable coating 4 is applied on the exterior-side surface III of the inner pane 2. The heatable coating 4 is, for example, a stack of a plurality of layers, which includes three conductive silver layers that are separated from one another by a plurality of dielectric layers. The heatable coating is transparent such that vision through the pane is not impaired to an extent that the pane would be made unsuitable as a windshield. Two busbars 5, 6 are applied on the heatable coating 4 for its electrical contacting. The busbars 5, 6 are implemented as approx. 5-mm-wide strips of a printed and fired screenprinting paste with silver particles and glass frits. The first busbar 5 is arranged along and in the vicinity of the upper edge O of the vehicle window; the second busbar 6, along and in the vicinity of the lower edge U. In the installed position of the windshield, the upper edge O points upward (roof edge) and the lower edge U points downward toward the ground (engine edge). The busbars 5, 6, for their part, are electrically contacted to supply lines 9, via which the connection of the busbars 5, 6 to the polls of an external voltage source is realised. The supply lines 9 are or contain a conductive copper foil, which is placed on and, optionally, soldered on a region of the busbars 5, 6. The second busbar 6 along the lower edge U is contacted by two such supply lines 9.

By means of the busbars 5, 6, the current is introduced into the coating 4, not at points, but rather distributed over the width of the busbars 5, 6. The current flows through the coating 4 in the region between the busbars 5, 6, whereby this region is heated, and a heating field that covers the central vision area of the pane is formed. The vision area can thus be freed of ice or moisture as needed.

The coating 4 is applied on the entire surface of surface III, with the exception of a peripheral edge region with a width of 10 mm and a communication window 8. The communication window 8 is arranged in the heating field between the busbars 5, 6 in the vicinity of the upper busbar 5 and is a coating-free region. The communication window ensures the transmission of electromagnetic radiation through the vehicle window, which would otherwise be reflected by the coating 4. Thus, for example, a sensor mounted on the inner pane 2 or radio data communication in the vehicle interior can function.

The heating power of such a pane is not homogeneous over the entire heating field. Instead, there are typically regions with elevated heat generation and regions with lower heat generation. The regions with elevated heat generation (hot spots) can, in the worst case, result in burns if the window is touched by a person, or even in damage to the window. The objective of the present invention is consequently to prevent the regions of elevated heat generation and to improve the homogeneity of the heating power.

A region with elevated heat generation develops in the vicinity of the contact points between the supply lines 9 and the busbars 5, 6. A disproportionately large share of the flow of electrical current into the coating 4 occurs, in fact, at these contact points.

In order to dissipate the heat out of the regions of elevated heat generation, the vehicle window has metal elements 7. The metal elements 7 are implemented as approx. 50-μm-thick copper foil and laminated into the vehicle window, wherein they are arranged on the interior-side surface II of the outer pane 1, i.e., between the outer pane 1 and the thermoplastic intermediate layer 3. Such a metal element is associated with each contact point between the lower busbar 6 and the supply lines 9, and is arranged overlapping with the contact point and extends from there a few centimeters in the direction of the center of the pane. The projection of the metal element 7 onto the coating 4 yields a a surface section that includes the region of elevated heat generation and also a region with contrastingly lower heat generation. The metal element 7 is thermoconductive. It heats up in the region of elevated heat generation and dissipates the heat into the regions of lower heat generation. The heat distribution is thus homogenised and a dangerous hot spot is avoided in the region of the supply lines 9. In the region of the contact point between the upper busbar 5 and its supply line 9, a metal element 7, which is not shown in the figure for reasons of clarity, can, of course, also be arranged.

Other regions of elevated heat generation occur in relation to the communication window 8. Since the current must flow around the communication window 8 next to it side, the flow of current is concentrated adjacent to the side edges of the communication window 8, where hot spots form. Therefore, another metal element 7 is arranged next to the communication window on both sides in the direction of flow of the current. The metal elements 7 have a distance of a few millimeters from the communication window 8 and extend a few centimeters from the communication window 8. By means of the metal elements 7, the excess heat can thus be dissipated out of the vicinity of the communication window 8, whereby the hot spot is prevented.

The metal elements and also the busbars 5, 6 are arranged in regions of the vehicle window that are provided with an opaque masking print 10. The masking print 10 is not shown in FIG. 1 for the sake of clarity. It runs along the pane edge with a width of approx. 10 cm, also around the communication window 8. The masking print 10 is applied on the surface II and the surface IV. The laminated-in metal elements 7 are concealed by it on both sides and are not perceived as disturbing by an observer.

Figure 3:
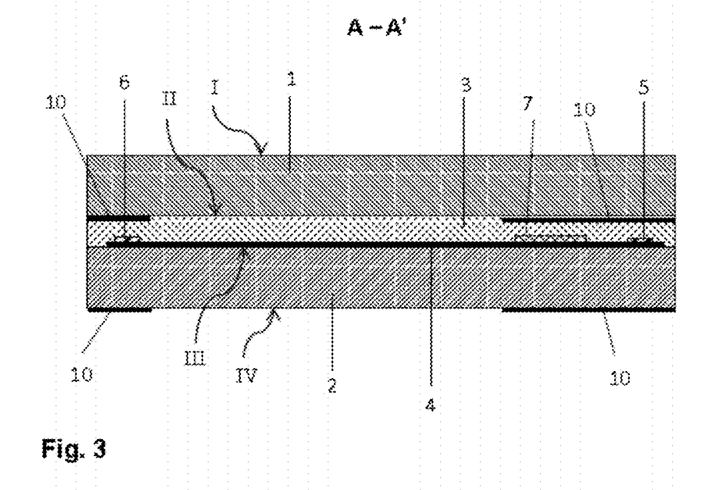

FIG. 3 depicts a section through an alternative embodiment of the vehicle window according to the invention. It differs from that described above in that the metal element 7 (copper foil) is arranged on the exterior-side surface III of the inner pane 2 and thus directly on the heatable coating 4. Since the uppermost layer of the coating 4 is a dielectric $Si_3N_4$ layer, the heating function of the coating 4 is not adversely affected, although the metal element 7 is electrically conductive. The metal element 7 can thus simply be placed on the coating 4 without special precautions. Optionally, the metal element 7 can also have an insulating coating, for example, a clear lacquer.

Figure 4:
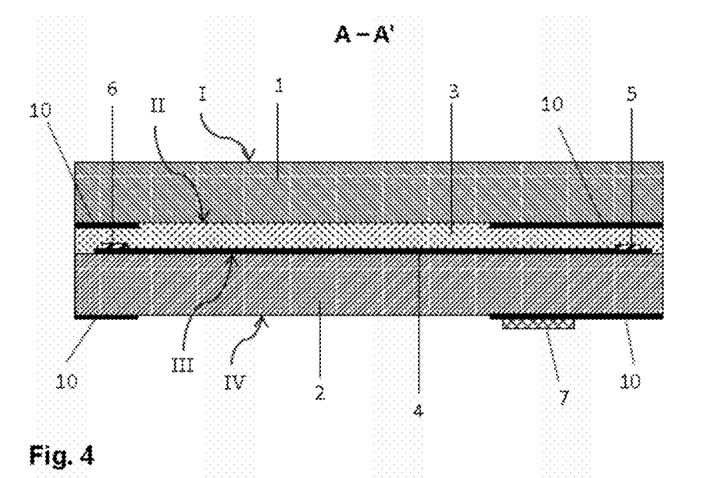

FIG. 4 depicts a section through another embodiment of the vehicle window according to the invention. The metal element 7 is glued onto the interior-side surface IV of the inner pane 2. The metal element 7 is implemented as an aluminum-steel sheet with a thickness of approx. 7 mm. The thermoconductive action of the metal element 7 also acts through the inner pane 2 such that even this arrangement is effective. The metal element 7 can be a sheet mounted specifically for this purpose. However, even an already present component can be used as the metal element 7, in particular the mounting bracket of the sensor that is arranged behind the communication window 8 and whose functionality the communication window 8 ensures.

Figure 5:
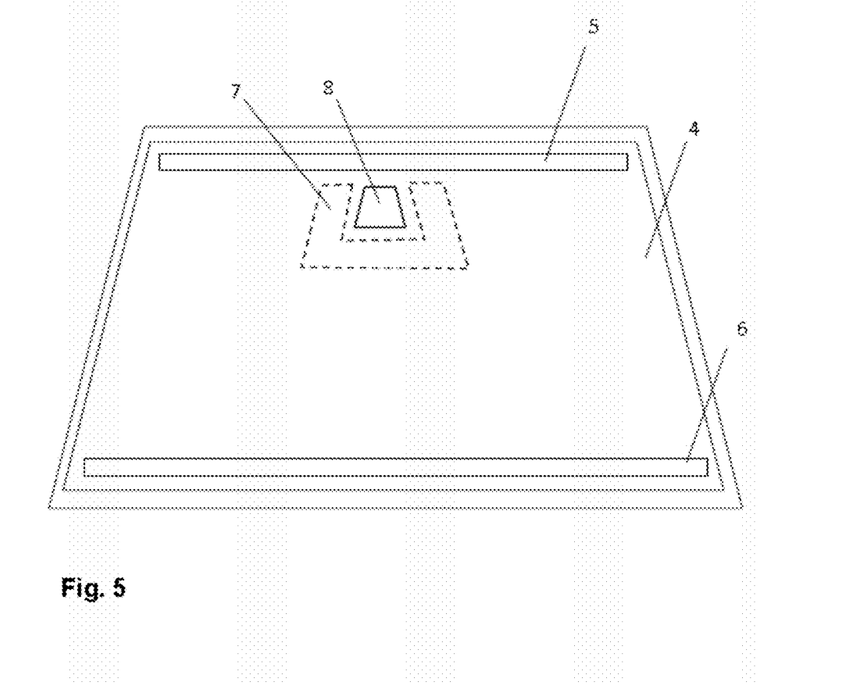

FIG. 5 depicts a plan view of another embodiment of the vehicle window according to the invention. Here again, a metal element 7 is associated with the communication window 8 in order to avoid hot spots. In contrast to the embodiment of FIG. 1, the metal element 7 is not only arranged next to the communication window 8 but, rather, extends along the edge of the communication window 8 facing away from the nearest busbar 5 such that the communication window 8 is surrounded on three sides by the metal element 7. By means of this design, the excess heat that is generated next to the communication window 8 is conducted partially into the region below the communication window 8. This region is electrically "shadowed" by the communication window 8 such that, here, there is only little heat generation. The metal element 7 contributes substantially to the homogenization of the heat profile by specifically conducting heat out of the hot spot into a region in which improved heating action is required.

Figure 6:
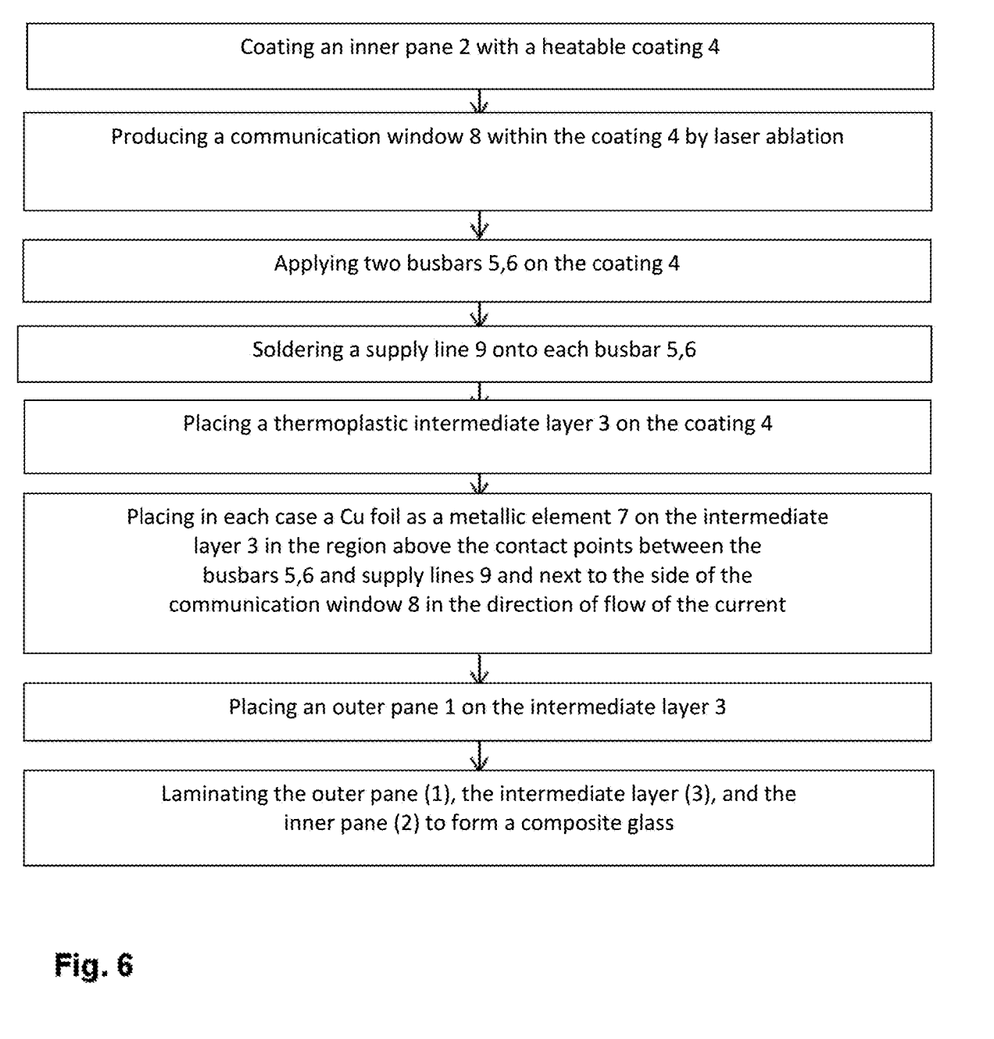

FIG. 6 depicts a flowchart of an exemplary embodiment of the method according to the invention for producing a heatable laminated vehicle window in accordance with FIG. 2.

Figure 7:
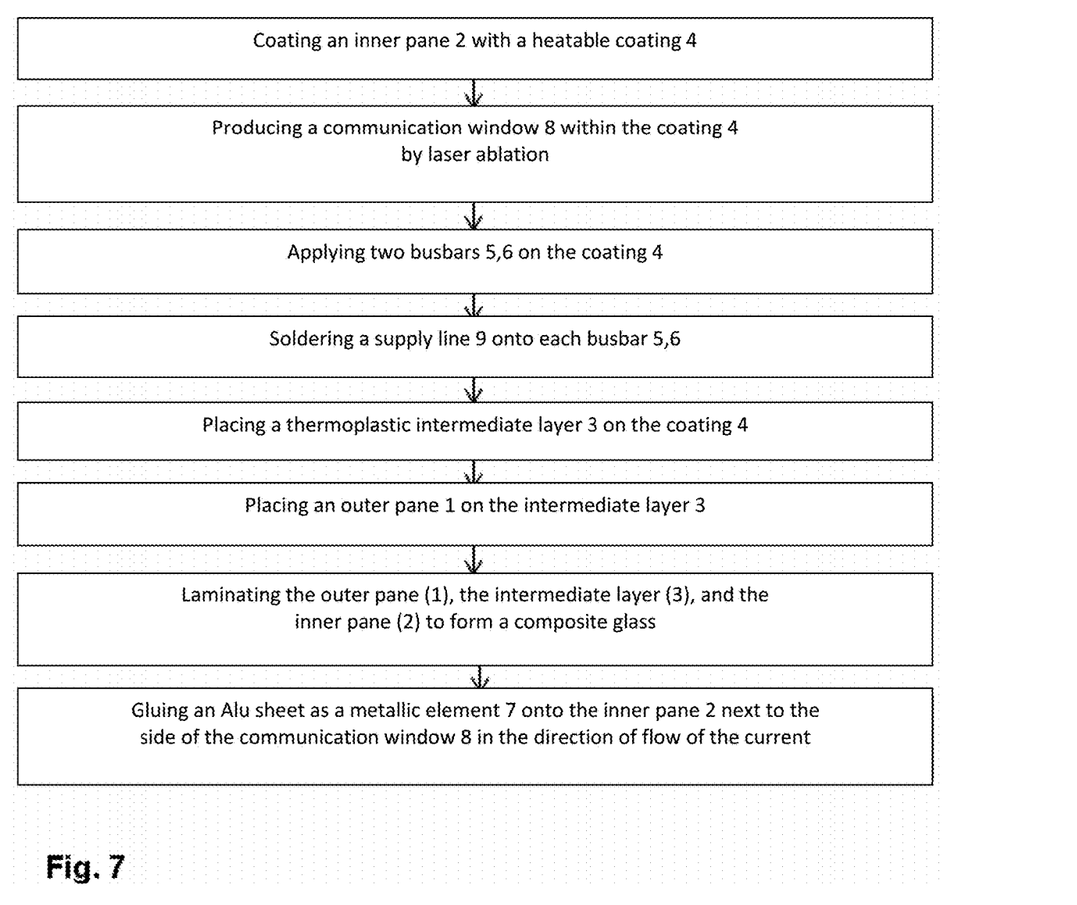

FIG. 7 depicts a flowchart of another exemplary embodiment of the method according to the invention in accordance with FIG. 4.

EXAMPLES

Different windshields with heatable coatings and a communication window 8 were investigated. After 12 minutes of heating action, thermography was recorded and the maximum temperature $T_{max}$ on the pane (hot spot) was determined. A pane without metal element 7 served as Reference System 1. In the examples according to the invention, the excess heat was dissipated out of the hot spot in the the vicinity of the communication window by different metal elements 7: a laminated-in foil made of aluminum, a laminated-in foil made of copper, and a so-called "bracket" (attachment device for attachment parts) made of cast iron glued onto Side IV. The measured values are summarised in Table 1, wherein ☐T indicates the difference in the maximum temperature relative to the Reference System 1.

TABLE 1

| | Metal Element 7 | $T_{max}$ | ☐T |
|---|---|---|---|
| 1 | — | 86.1° C. | — |
| 2 | Alu foil, laminated-in | 76.6° C. | −9.5° C. |
| 3 | Cu foil, laminated-in | 63.0° C. | −23.1° C. |
| | Cast-iron bracket on Side IV | 70.2° C. | −15.9° C. |

It is discernible from the table that all embodiments result in a significant lowering of the temperature on the hot spot. Critical maximum temperatures can be avoided and the heat distribution is homogenised. These are major advantages of the invention.

LIST OF REFERENCE CHARACTERS (1) outer pane
(2) inner pane
(3) thermoplastic intermediate layer
(4) electrically conductive coating
(5) busbar
(6) busbar
(7) metal element
(8) coating-free region, communication window
(9) supply line to busbar
(10) opaque masking print
(O) upper edge
(U) lower edge
I exterior-side surface of the outer pane
II interior-side surface of the outer pane
III exterior-side surface of the inner pane
IV interior-side surface of the inner pane
A-A' section line

The invention claimed is:

1. A heatable laminated vehicle window for separating a vehicle interior from an outer surrounding area, comprising:
   an outer pane and an inner pane that are bonded to one another via a thermoplastic intermediate layer;
   an electrically heatable coating that is electrically connected to at least two busbars provided for electrical connection to two poles of a voltage source, so that application of a supply voltage to the two poles causes a flow of a heating current to form a heating field between the at least two busbars; and
   at least one metal element that is arranged on or in the vehicle window, so that heat is dissipated out of a region of the heating field with elevated heat generation by means of thermal conduction of the at least one metal element.

2. The vehicle window according to claim 1, wherein the at least one metal element is a foil, a sheet, or a cast part.

3. The vehicle window according to claim 1, wherein a projection of the at least one metal element onto the electrically heatable coating corresponds to a region of the electrically heatable coating having a heating power that, locally, is at least 15% higher than an average heating power of the heating field.

4. The vehicle window according to claim 1, further comprising a locally limited region arranged between the busbars that is free of the heatable coating, wherein the at least one metal element is arranged next to a side of the locally limited region in a direction of the flow of the heating current.

5. The vehicle window according to claim 4, wherein the at least one metal element comprises two metal elements, each arranged on a respective side of the locally limited region in a direction of the flow of the heating current.

6. The vehicle window according to claim 1, wherein the at least one metal element overlaps a contact point between a busbar of the at least two busbars and a supply line connected thereto.

7. The vehicle window according to claim 1, wherein the at least one metal element is laminated into the vehicle window.

8. The vehicle window according to claim 7, wherein the at least one metal element is arranged on the heatable coating.

9. The vehicle window according to claim 8, wherein the at least one metal element has an electrical insulating coating.

10. The vehicle window according to claim 7, wherein the at least one metal element is separated from the heatable coating by material of the thermoplastic intermediate layer.

11. The vehicle window according to claim 1, wherein the at least one metal element is arranged on an interior-side surface of the inner pane.

12. The vehicle window according to claim 11, wherein the at least one metal element is a sheet or a cast part that is designed with cooling ribs.

13. The vehicle window according to claim 1, wherein the at least one metal element is arranged in a region of the vehicle window that is provided with an opaque masking print.

14. The vehicle window according to claim 1, wherein the heatable coating is arranged on a surface of the outer pane or the inner pane facing the thermoplastic intermediate layer.

15. The vehicle window according to claim 1, wherein the heatable coating is arranged on a carrier film within the intermediate layer.

16. The vehicle window according to claim 1, wherein a busbar of the at least two busbars is implemented as one of: a) fired printing paste, and b) a strip of an electrically conductive foil.

17. The vehicle window according to claim 16, wherein a) contains silver particles and glass frits, and wherein b) contains copper.

18. A method for producing a heatable laminated vehicle window for separating a vehicle interior from an outer surrounding area, the method comprising:
   preparing an outer pane, a thermoplastic intermediate layer, and an inner pane, wherein one of the outer pane, the inner pane, and the intermediate layer is provided with an electrically heatable coating;
   connecting the electrically heatable coating to at least two busbars provided for electrical connection to two poles of a voltage source so that by applying a supply voltage to the two poles, a heating current flows between the at least two busbars thereby forming a heating field between the at least two busbars; and bonding the outer pane and the inner pane to one another via the intermediate layer by lamination;
wherein before or after lamination, at least one metal element is arranged on or in the vehicle window thereby dissipating heat out of a region of the heating field with elevated heat generation by means of thermal conduction of the at least one metal element.

19. A method for using of a vehicle window, comprising: providing a vehicle window according to claim 1; and using the vehicle window in means of transportation for travel on land, in the air, or on water.

20. The method of claim 19, wherein the means of transportation comprises motor vehicles and wherein the vehicle window is used as a windshield.

\* \* \* \* \*